(12) United States Patent
Linton et al.

(10) Patent No.: US 11,138,781 B1
(45) Date of Patent: Oct. 5, 2021

(54) CREATION OF PHOTOREALISTIC 3D AVATARS USING DEEP NEURAL NETWORKS

(71) Applicant: INTERNATIONAL BUSINESS MACHINES CORPORATION, Armonk, NY (US)

(72) Inventors: Jeb R. Linton, Manassas, VA (US); Satya Sreenivas, Los Alamos, NM (US); Naeem Atlaf, Round Rock, TX (US); Sanjay Nadhavajhala, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/837,573

(22) Filed: Apr. 1, 2020

(51) Int. Cl.
  *G06T 13/40* (2011.01)
  *G06T 3/40* (2006.01)
  *G06N 3/08* (2006.01)
  *G10L 13/027* (2013.01)
  *G06T 17/20* (2006.01)

(52) U.S. Cl.
  CPC .............. *G06T 13/40* (2013.01); *G06N 3/08* (2013.01); *G06T 3/4053* (2013.01); *G06T 17/20* (2013.01); *G10L 13/027* (2013.01)

(58) Field of Classification Search
  None
  See application file for complete search history.

(56) References Cited

U.S. PATENT DOCUMENTS

| 8,487,954 | B2 | 7/2013 | Harvill |
| 8,553,037 | B2 | 10/2013 | Smith et al. |
| 9,786,084 | B1 | 10/2017 | Bhat et al. |
| 10,204,438 | B2 | 2/2019 | Hushchyn et al. |
| 10,803,646 | B1* | 10/2020 | Bogan, III ............... G06N 3/08 |
| 2018/0300927 | A1* | 10/2018 | Hushchyn ............. H04L 65/602 |
| 2019/0266807 | A1* | 8/2019 | Lee ........................ G06T 13/40 |
| 2019/0370938 | A1* | 12/2019 | Huang ................. G06T 3/4053 |
| 2020/0184705 | A1* | 6/2020 | Li ............................. G06T 1/20 |

FOREIGN PATENT DOCUMENTS

EP 1510973 A2 2/2005

OTHER PUBLICATIONS

James, M. (May 2019). GANs create talking avatars from one photo. Retrieved from https://www.i-programmer.info/news/105-artificial-intelligence/12802-gans-create-talking-avatars-from-one-photo.html.
Constantine, J. (Mar. 2019). Morphin instantly Deepfakes your face into GIFs. TechCrunch. Retrieved from https://techcrunch.com/2019/03/20/morphin-avatars/, 3 pages.
Hu, et. al, "Avatar Digitization From a Single Image for a Single Image for Real-Time Rendering," ACM Transactions on Graphics, vol. 36, No. 6, Article 1. Publication date: Nov. 2017, 14 pages.

* cited by examiner

Primary Examiner — Yi Wang
(74) Attorney, Agent, or Firm — Conley Rose, P.C.

(57) ABSTRACT

A computer-implemented method for the automatic generation of photorealistic 3D avatars. The method includes generating, using machine learning network, a plurality of 2D photorealistic facial images; generating, using a model agnostic meta-learner, a plurality of 2D photorealistic facial expression images based on the plurality of 2D photorealistic facial images; and generating a plurality of 3D photorealistic avatars based on the plurality of 2D photorealistic facial expression images.

20 Claims, 4 Drawing Sheets

CREATION OF PHOTOREALISTIC 3D AVATARS USING DEEP NEURAL NETWORKS

BACKGROUND

The gaming, movie, and media entertainment industries currently spend a great deal of time and money creating three-dimensional (3D) virtual characters or avatars by employing human artists. An avatar is a virtual figure or character representing a particular person in an electronic medium such as, but not limited to, in a video game, in an Internet forum, or during an online communication session. Each avatar or character may take hours to create.

Recent advances in Deep Learning have resulted in several new techniques for photorealistic two-dimensional (2D) image generation enabling the automatic generation of unlimited numbers of photorealistic-looking photographs indistinguishable from photographs of real people.

SUMMARY

The disclosed embodiments include a system, computer program product, and computer-implemented method for the automatic generation of photorealistic 3D avatars using various combinations of Deep Neural Network techniques. The disclosed embodiments reduce the time, skill, and cost associated with creating 3D avatars that can be used in various environments.

In one embodiment, a computer-implemented method for the automatic generation of photorealistic 3D avatars is disclosed. The method includes generating, using machine learning network, a plurality of 2D photorealistic facial images; generating, using a model agnostic meta-learner, a plurality of 2D photorealistic facial expression images based on the plurality of 2D photorealistic facial images; and generating a plurality of 3D photorealistic avatars based on the plurality of 2D photorealistic facial expression images.

In another embodiment, a system configured to automatically generate photorealistic 3D avatars is disclosed. The system includes memory for storing instructions, and a processor configured to execute the instructions to: generate a plurality of 2D photorealistic facial images by a machine learning network; generate a plurality of 2D photorealistic facial expression images based on the plurality of 2D photorealistic facial images using a model agnostic meta-learner; and generate a plurality of 3D photorealistic avatars based on the plurality of facial expression images.

In another embodiment, a computer program product for automatically generating photorealistic 3D avatars is disclosed. The computer program product comprises a computer readable storage medium having program instructions embodied therewith, the program instructions executable by a processor of a system to cause the system to: generate a plurality of 2D photorealistic facial images by a machine learning network; generate a plurality of 2D photorealistic facial expression images based on the plurality of 2D photorealistic facial images using a model agnostic meta-learner; and generate a plurality of 3D photorealistic avatars based on the plurality of facial expression images.

Optionally, in any of the preceding embodiments, the plurality of 2D photorealistic facial expression images is transform to 3D by applying digital coordinate transform to a stretched skin-sized and shaped 2D facial expression image for wrapping around a wireframe of a head and shoulders of a 3D avatar.

Optionally, in any of the preceding embodiments, a U-Network trained on a set of photographic skins and their equivalent is used to fill in gaps in a back of a head of a 3D avatar.

Optionally, in any of the preceding embodiments, a U-Network trained on a set of photographic hair and their equivalent is used to fill in hair at the back of the head based on a color, style, and length of the hair in an original image.

Optionally, in any of the preceding embodiments, a super-resolution technique is applied to sharpen the 3D images/avatars.

Optionally, in any of the preceding embodiments, a Generative Adversarial Network (GAN) is used to generate the plurality of 2D photorealistic facial images.

Optionally, in any of the preceding embodiments, a Style Transfer Network is used to generate the plurality of 2D photorealistic facial images.

Optionally, in any of the preceding embodiments, a combination of a GAN and a Style Transfer Network is used to generate the plurality of 2D photorealistic facial images.

Optionally, in any of the preceding embodiments, Wavenet is used to generate a real voice for a particular 3D avatar.

Other embodiments and advantages of the disclosed embodiments are further described in the detailed description.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

The illustrated figures are only exemplary and are not intended to assert or imply any limitation with regard to the environment, architecture, design, or process in which different embodiments may be implemented.

DETAILED DESCRIPTION

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to". Unless otherwise indicated, as used throughout this document, "or" does not require mutual exclusivity, and the singular forms "a", "an" and "the" are intended to include the plural forms as well, unless the context clearly indicates otherwise.

A module or unit as referenced herein may comprise one or more hardware or electrical components such as electrical circuitry, processors, and memory that may be specially configured to perform a particular function. The memory may be volatile memory or non-volatile memory that stores data such as, but not limited to, computer executable instructions, machine code, and other various forms of data. The module or unit may be configured to use the data to execute one or more instructions to perform one or more tasks. In certain instances, a module may also refer to a particular set of functions, software instructions, or circuitry that is configured to perform a specific task. For example, a module may comprise software components such as, but not limited to, data access objects, service components, user interface components, application programming interface (API) components; hardware components such as electrical circuitry, processors, and memory; and/or a combination thereof. As referenced herein, computer executable instructions may be in any form including, but not limited to, machine code, assembly code, and high-level programming code written in any programming language.

Figure 1:
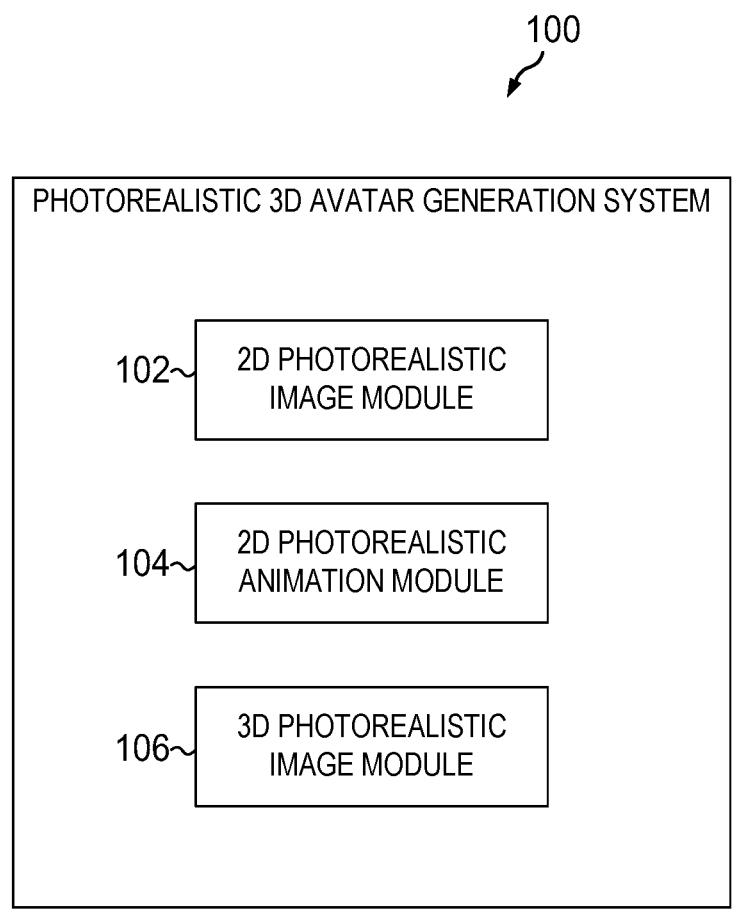
FIG. 1 is a schematic diagram illustrating a photorealistic 3D avatar generation system in accordance with an embodiment of the present disclosure.

FIG. 1 is a schematic diagram illustrating a photorealistic 3D avatar generation system 100 in accordance with an embodiment of the present disclosure. The photorealistic 3D avatar generation system 100 is configured to automatically generate photorealistic 3D avatars or images using a combination of Deep Neural Network techniques. The auto-generated 3D avatars, images, or characters are suitable for various purposes such as, but not limited to, video games, movies, advertisements, online forums, and other forms of electronic communications. As non-limiting examples, the photorealistic 3D avatar generation system 100 can be used by a 3D gaming company that has a limited art budget, or the photorealistic 3D avatar generation system 100 can be used by an advertising company that wants to create many versions of an ad using different auto-generated 3D photorealistic avatars so that they can target the ad to different demographics. Thus, the photorealistic 3D avatar generation system 100 increases reduces the time, required skill level, and cost associated with creating 3D avatars that can be used in various environments.

Figure 2:
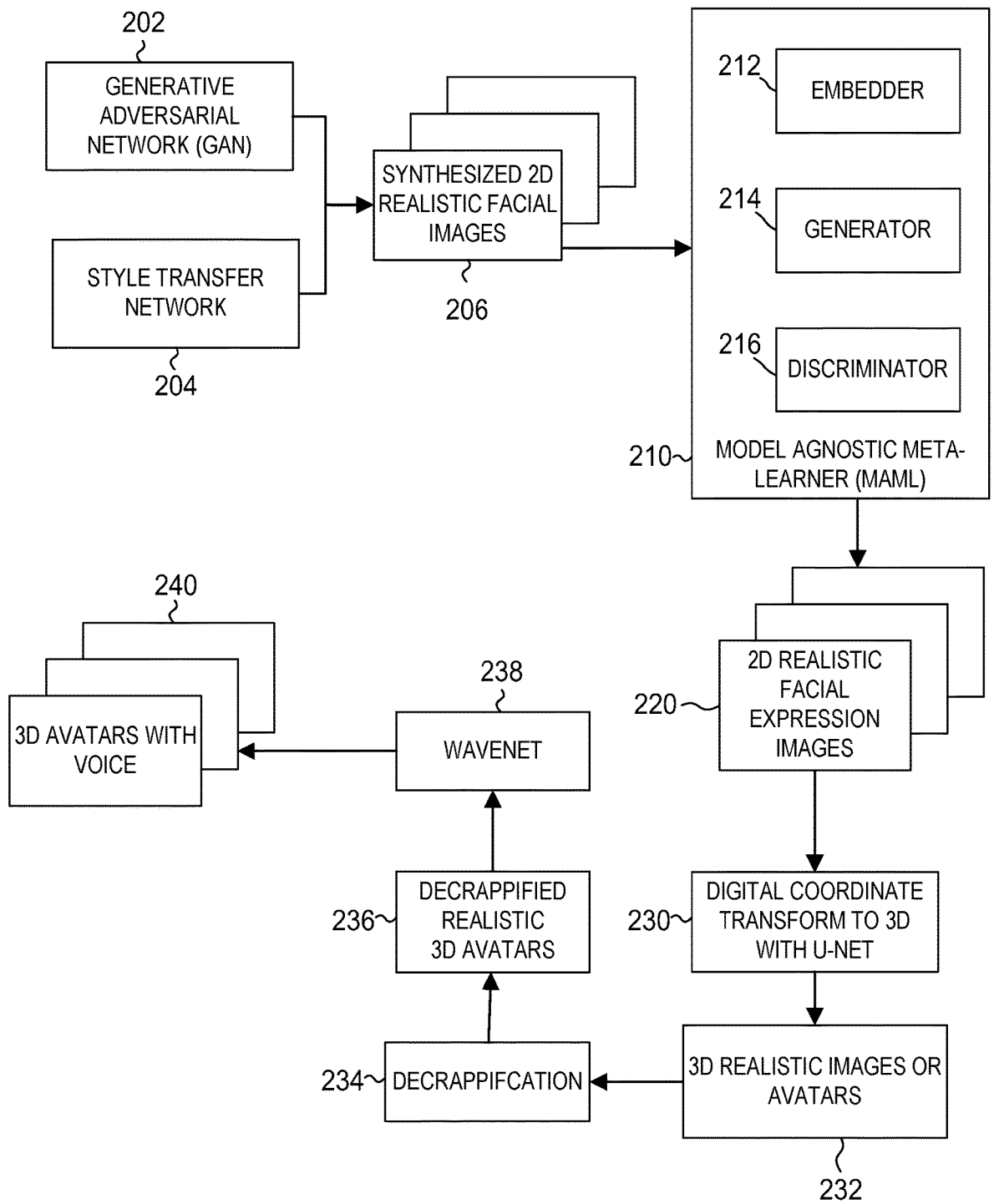
FIG. 2 is a schematic diagram illustrating a pipeline for creating 3D images in accordance with an embodiment of the present disclosure.

In the depicted embodiment, the photorealistic 3D avatar generation system 100 includes a 2D photorealistic image module 102, a 2D photorealistic animation module 104, and a 3D photorealistic image module 106. In an embodiment, the 2D photorealistic image module 102 includes executable instructions that auto-generate 2D photorealistic images. As used herein, photorealistic means generally indistinguishable from actual photographs of real people. As further described below, the 2D photorealistic image module 102 can include executable instructions for utilizing a Generative Adversarial Network (GAN) and/or a Style Transfer Network in auto-generating 2D photorealistic images. In an embodiment, the 2D photorealistic animation module 104 includes executable instructions that auto-animate the 2D photorealistic images to create a set of 2D photorealistic facial expression images. For example, the set of 2D photorealistic facial expression images can include various mouth, eye, and facial movements/positions that correlate to a person speaking or performing other actions. In an embodiment, the 2D photorealistic animation module 104 employs a Model Agnostic Meta-Learner 210, as shown in FIG. 2, for generating the set of 2D photorealistic facial expression images. The 3D photorealistic image module 106 includes executable instructions that auto-generates a plurality of 3D photorealistic images or avatars using the set of 2D photorealistic facial expression images. In some embodiments, the 3D photorealistic image module 106 also includes executable instructions that can generate and add voice to a 3D generated avatar. In some embodiments, the 3D photorealistic image module 106 includes executable instructions that utilize 2D to 3D digital coordinate transform for creating the 3D avatar. In some embodiments, the 3D photorealistic image module 106 can also include executable instructions for utilizing various deep learning techniques such as, but not limited to, U-Network, decrappification, and super-resolution to improve the generated 3D avatar.

FIG. 2 is a schematic diagram illustrating a process 200 for creating 3D images in accordance with an embodiment of the present disclosure. The process 200 can be performed by a system such as, but not limited to, the photorealistic 3D avatar generation system 100 of FIG. 1. The process 200 synthesizes 2D photorealistic facial images 206 using one or more a machine learning networks or artificial neural networks that learn (i.e., progressively improve their ability) to do tasks by considering examples, generally without task-specific programming. For instance, for image recognition, the machine learning network might learn to identify images that contain cats by analyzing example images that have been manually labeled as "cat" or "no cat," and using the analytic results to identify cats in other images. Non-limiting examples of a machine learning network that can be used by the process 200 to synthesize the 2D photorealistic facial images 206 include a GAN 202 and/or a Style Transfer Network 204. The GAN 202 is a class of machine learning systems that learns to generate new data with the same statistics as the training set. For instance, in an embodiment, the GAN 202 is trained using real photographs of people, and can then generate new photographs of artificial human-like faces having many photorealistic characteristics a real person that look at least superficially authentic to human observers. The Style Transfer Network 204 is trained to compose images in the style of another image. For example, the Style Transfer Network 204 can be trained to take three images, a content image, a style reference image (such as an artwork by a famous painter), and an input image; and blend them together such that the input image is transformed to look like the content image, but "painted" in the style of the style image.

The process 200 then generates 2D photorealistic facial expression images 220 from the synthesized 2D photorealistic facial images 206. The process 200 uses the 2D photorealistic facial expression images 220 to animate the face by creating a comprehensive set of expressions with various mouth and eye positions (i.e., an expression library) for each of the synthesized 2D photorealistic facial images 206. In an embodiment, the process 200 generates the synthesized 2D photorealistic facial images 206 from the synthesized 2D photorealistic facial images 206 using Model Agnostic Meta-Learner (MAML) 210. The MAML 210 is a meta-learner compatible with any trained model and applicable to a variety of different learning problems. A meta-learner is a model that learns the learning process. In an embodiment, the MAML 210 is configured to learn new skills or adapt to new environments rapidly with a few training examples. In particular, the MAML 210 is configured to learn how to animate a face from a 2D photorealistic facial expression image to create a set facial expression for that face based on training samples that depict various facial expressions.

In the depicted embodiment, the MAML 210 includes an Embedder 212, a Generator 214, and a Discriminator 216. In an embodiment, the Embedder 212 maps facial images (with estimated facial landmarks) into N-dimensional embedding vectors that contain pose-independent information. The Generator 214 generates new images by mapping input facial landmarks into output images using the embedding vectors to maximize the similarity between its outputs and the input facial landmarks. The Discriminator 216 is trained to determine whether the generated output image of the Generator 214 is of sufficient quality that it is not discernable from an actual photograph of a real person. For instance, in an embodiment, the Discriminator 216 is trained using real and fake photos, and once the Discriminator 216 can no longer discern that a photo produced by the Generator 214 is a fake photo, then the photos produced by the Generator 214 is considered photorealistic. In an embodiment, any image that does not meet the standard of the Discriminator 216 is not output as part of the 2D photorealistic facial expression images 220 by the MAML 210.

The 2D photorealistic facial expression images 220 are then used to generate a plurality of 3D photorealistic avatars or avatars 232. In an embodiment, a 2D photorealistic facial expression image is transformed to a 3D image with photorealistic facial expression images by applying digital coordinate transform with a U-network (U-Net) 230 to a stretched skin-sized and shaped for wrapping around a wireframe of a head and shoulders of an avatar. U-Net is a convolutional neural network that was originally developed for biomedical image segmentation. In an embodiment, the U-Net 230 can be trained on a set of photographic skins and their equivalent with the back of the head removed, and based on the training, the U-Net 230 can fill in the back of the head. For example, in an embodiment, the U-Net fills in the hair at the back of the head based on the color, style, and length of a person's hair in an original photograph.

A decrappification process 234 can then be applied to the plurality of 3D photorealistic images or avatars 232 to generate a set of decrappified photorealistic 3D avatars 236. Decrappification is a deep learning method that can increase the resolution, remove artifacts, and remove texts that obscure parts of an image. In some embodiments, the image may be deoldified, which is a process that colorizes a black and white image. Optionally, the 3D skin can be sharpened using a third technique such as, but not limited to, super-resolution. Super-resolution is a term for a set of methods used for upscaling video or images (i.e., increasing the resolution of videos or images).

In an embodiment, an avatar voice can then be added to generate 3D images/avatars with voice 240. In an embodiment, Wavenet 234 can be used to generate a real voice (e.g., a user's voice or an actor/celebrity's voice) for a specific 3D photorealistic image/avatar. WaveNet is a deep neural network for generating raw audio. In an embodiment, style transfer or other deep neural networks can be used for voice generation.

Figure 3:
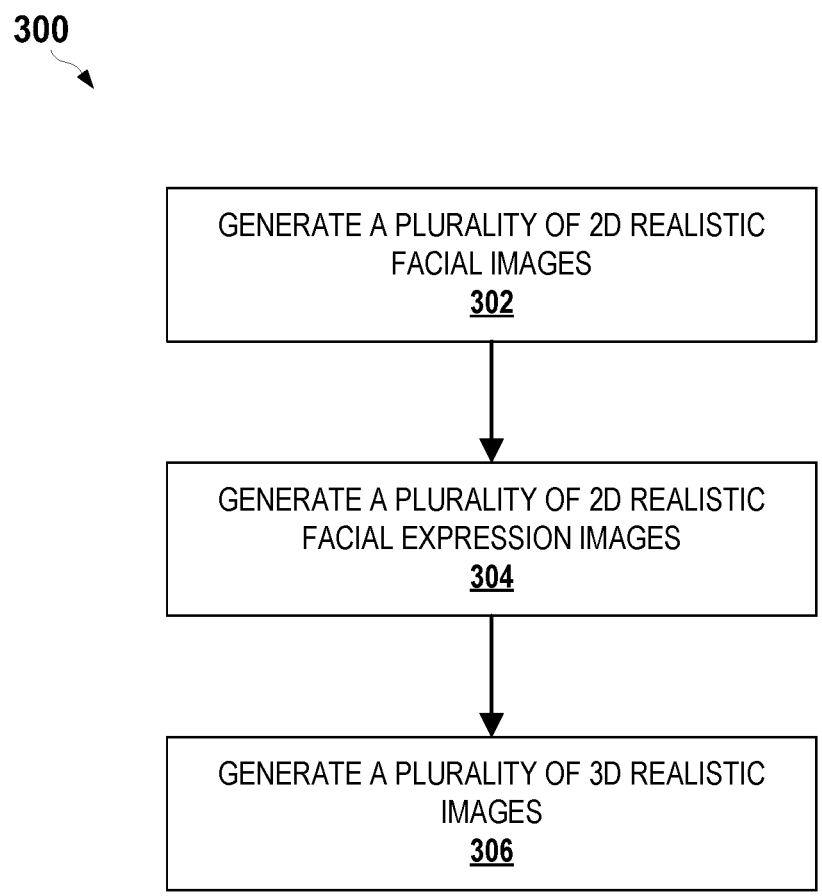
FIG. 3 is a flowchart illustrating a process for automatic generation of photorealistic 3D avatars in accordance with an embodiment of the present disclosure.

FIG. 3 is flowchart illustrating a process 300 for automatic generation of photorealistic 3D avatars in accordance with an embodiment of the present disclosure. The process 300 can be performed by a system such as, but not limited to, the photorealistic 3D avatar generation system 100 of FIG. 1. The process 300 begins, at step 302, by generating a plurality of 2D photorealistic facial images. As described above, the process 300 may use various machine learning networks such as, but not limited to, a GAN, a Style Transfer Network, or a combination thereof.

At step 304, the process 300 generates a plurality of 2D photorealistic facial expression images based on the plurality of 2D photorealistic facial images. In an embodiment, the process 300 uses a MAML to animate a face, and create a comprehensive set of facial expressions with various mouth and eye positions.

At step 306, the process 300 generates a plurality of 3D photorealistic avatars based on the plurality of 2D photorealistic facial expression images. In an embodiment, this process involves applying a digital coordinate transform to a stretched skin-sized and shaped 2D facial expression image for wrapping around a wireframe of a head and shoulders of an avatar. In some embodiments, the process 300 automatically fills in hair at the back of the head of the avatar based on a color, style, and length of hair in an original image. In some embodiments, the process 300 applies a decrappification technique to remove unwanted artifacts, and applies a super-resolution technique to sharpen the 3D photorealistic images. As stated above, in some embodiments, the process 300 utilizes a voice generation network for converting a real voice into a generated voice for the 3D photorealistic avatar.

Figure 4:
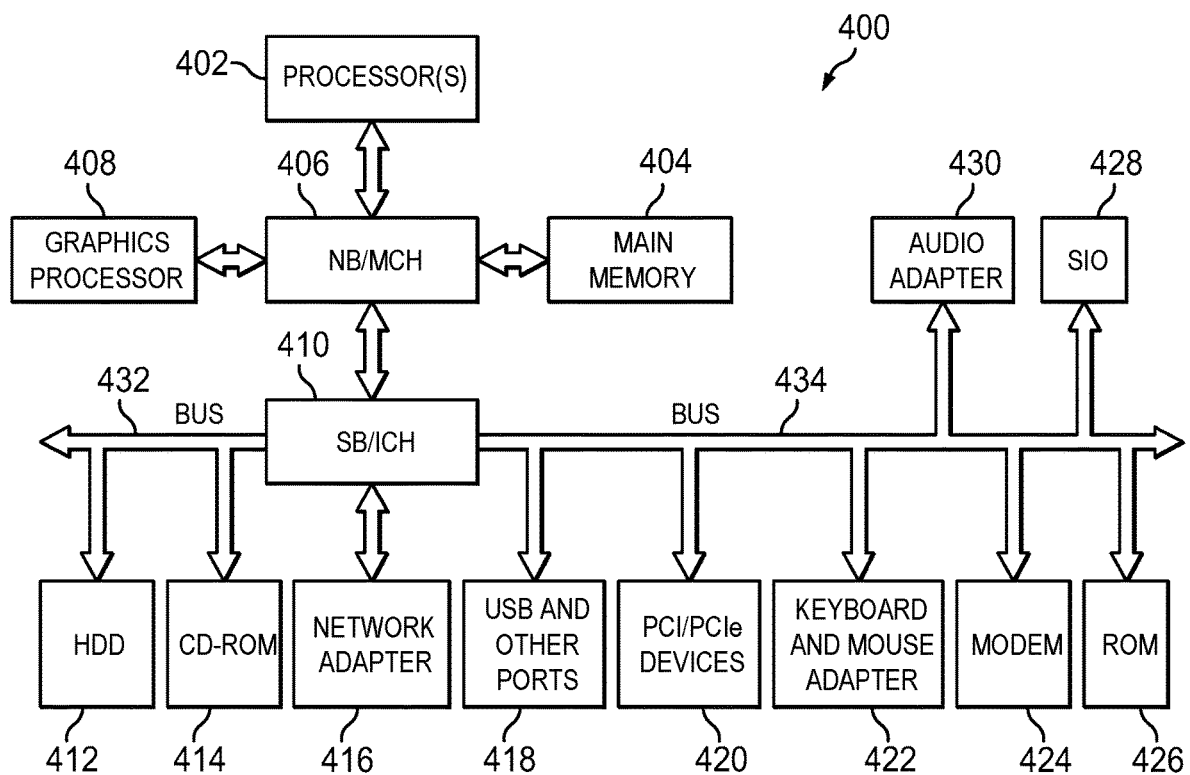
FIG. 4 is a block diagram illustrating a hardware architecture of a system according to an embodiment of the present disclosure in which aspects of the illustrative embodiments may be implemented.

FIG. 4 is a block diagram illustrating a hardware architecture of a system 400 according to an embodiment of the present disclosure in which aspects of the illustrative embodiments may be implemented. For example, in one embodiment, the photorealistic 3D avatar generation system 100 of FIG. 1 may be implemented using the data processing system 400. Additionally, the data processing system 400 may be configured to store and execute instructions for performing the process or pipeline described in FIG. 2 and FIG. 3. In the depicted example, the data processing system 400 employs a hub architecture including north bridge and memory controller hub (NB/MCH) 406 and south bridge and input/output (I/O) controller hub (SB/ICH) 410. Processor(s) 402, main memory 404, and graphics processor 408 are connected to NB/MCH 406. Graphics processor 408 may be connected to NB/MCH 406 through an accelerated graphics port (AGP). A computer bus, such as bus 432 or bus 434, may be implemented using any type of communication fabric or architecture that provides for a transfer of data between different components or devices attached to the fabric or architecture.

In the depicted example, network adapter 416 connects to SB/ICH 410. Audio adapter 430, keyboard and mouse adapter 422, modem 424, read-only memory (ROM) 426, hard disk drive (HDD) 412, compact disk read-only memory (CD-ROM) drive 414, universal serial bus (USB) ports and other communication ports 418, and peripheral component interconnect/peripheral component interconnect express (PCI/PCIe) devices 420 connect to SB/ICH 410 through bus 432 and bus 434. PCI/PCIe devices may include, for example, Ethernet adapters, add-in cards, and personal computing (PC) cards for notebook computers. PCI uses a card bus controller, while PCIe does not. ROM 426 may be, for example, a flash basic input/output system (BIOS). Modem 424 or network adapter 416 may be used to transmit and receive data over a network.

HDD 412 and CD-ROM drive 414 connect to SB/ICH 410 through bus 434. HDD 412 and CD-ROM drive 414 may use, for example, an integrated drive electronics (IDE) or serial advanced technology attachment (SATA) interface. In some embodiments, HDD 412 may be replaced by other forms of data storage devices including, but not limited to, solid-state drives (SSDs). A super I/O (SIO) device 428 may be connected to SB/ICH 410. SIO device 428 may be a chip on the motherboard that is configured to assist in performing less demanding controller functions for the SB/ICH 410 such as controlling a printer port, controlling a fan, and/or controlling the small light emitting diodes (LEDS) of the data processing system 400.

The data processing system 400 may include a single processor 402 or may include a plurality of processors 402. Additionally, processor(s) 402 may have multiple cores. For example, in one embodiment, data processing system 400 may employ a large number of processors 402 that include hundreds or thousands of processor cores. In some embodiments, the processors 402 may be configured to perform a set of coordinated computations in parallel.

An operating system is executed on the data processing system 400 using the processor(s) 402. The operating system coordinates and provides control of various components within the data processing system 400 in FIG. 4. Various applications and services may run in conjunction with the operating system. Instructions for the operating system, applications, and other data are located on storage devices, such as one or more HDD 412, and may be loaded into main memory 404 for execution by processor(s) 402. In some embodiments, additional instructions or data may be stored on one or more external devices. The processes described herein for the illustrative embodiments may be performed by processor(s) 402 using computer usable program code, which may be located in a memory such as, for example, main memory 404, ROM 426, or in one or more peripheral devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented method, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. Further, the steps of the methods described herein may be carried out in any suitable order, or simultaneously where appropriate. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for automatic generation of photorealistic 3D avatars, the method comprising:
   generating, using a machine learning network, a plurality of 2D photorealistic artificial human-like facial images;
   generating, using a model agnostic meta-learner, a plurality of 2D photorealistic artificial human-like facial expression images based on the plurality of 2D photorealistic artificial human-like facial images, wherein the model agnostic meta-learner employs a Generator/Discriminator/Embedder architecture to create a comprehensive set of expressions with various mouth and eye positions; and
   generating a plurality of 3D photorealistic artificial human-like avatars based on the plurality of 2D photorealistic artificial human-like facial expression images.

2. The method of claim 1, wherein generating the plurality of 3D photorealistic artificial human-like avatars based on the plurality of 2D photorealistic artificial human-like facial expression images comprises transforming the plurality of 2D photorealistic artificial human-like facial expression images by applying digital coordinate transform to a stretched skin-sized and shaped 2D facial expression image for wrapping around a wireframe of a head and shoulders of an avatar.

3. The method of claim 2, wherein generating the plurality of 3D photorealistic artificial human-like avatars based on the plurality of 2D photorealistic artificial human-like facial expression images further comprises filling in gaps in a back of the head using a U-Network trained on a set of photographic skins and their equivalent with the back of the head removed.

4. The method of claim 3, wherein generating the plurality of 3D photorealistic artificial human-like avatars based on the plurality of 2D photorealistic artificial human-like facial expression images further comprises filling in hair at the back of the head based on a color, style, and length of the hair in an original image.

5. The method of claim 4, wherein generating the plurality of 3D photorealistic artificial human-like avatars based on the plurality of 2D photorealistic artificial human-like facial expression images further comprises applying a super-resolution technique to sharpen the 3D photorealistic artificial human-like avatars.

6. The method of claim 1, further comprising generating a voice generation network for converting a real voice to that of an avatar.

7. The method of claim 1, wherein the model agnostic meta-learner employs the Generator/Discriminator/Embedder architecture is used to animate a face.

8. The method of claim 1, wherein the machine learning network used to generate the plurality of 2D photorealistic artificial human-like facial images is a Generative Adversarial Network (GAN).

9. The method of claim 1, wherein the machine learning network used to generate the plurality of 2D photorealistic artificial human-like facial images is a Style Transfer Network.

10. The method of claim 1, wherein the machine learning network used to generate the plurality of 2D photorealistic artificial human-like facial images is a combination of a Generative Adversarial Network (GAN) and a Style Transfer Network.

11. A system configured to automatically generate photorealistic 3D avatars, the system comprising memory for storing instructions, and a processor configured to execute the instructions to:
   generate a plurality of 2D photorealistic artificial human-like facial images by a machine learning network;
   generate a plurality of 2D photorealistic artificial human-like facial expression images based on the plurality of 2D photorealistic artificial human-like facial images using a model agnostic meta-learner, wherein the model agnostic meta-learner employs a Generator/Discriminator/Embedder architecture to create a comprehensive set of expressions with various mouth and eye positions; and
   generate a plurality of 3D photorealistic artificial human-like avatars based on the plurality of 2D photorealistic artificial human-like facial expression images.

12. The system of claim 11, wherein generating the plurality of 3D photorealistic artificial human-like avatars based on the plurality of 2D photorealistic artificial human-like facial expression images comprises transforming the plurality of 2D photorealistic artificial human-like facial expression images by applying digital coordinate transform to a stretched skin-sized and shaped 2D facial expression image for wrapping around a wireframe of a head and shoulders of an avatar.

13. The system of claim 12, wherein generating the plurality of 3D photorealistic artificial human-like avatars based on the plurality of 2D photorealistic artificial human-like facial expression images further comprises filling in gaps in a back of the head using a U-Network trained on a set of photographic skins and their equivalent with the back of the head removed.

14. The system of claim 13, wherein generating the plurality of 3D photorealistic artificial human-like avatars based on the plurality of 2D photorealistic artificial human-like facial expression images further comprises applying a deep learning technique to fill in hair at the back of the head based on a color, style, and length of the hair in an original image.

15. The system of claim 14, wherein generating the plurality of 3D photorealistic artificial human-like avatars based on the plurality of 2D photorealistic artificial human-like facial expression images further comprises applying a super-resolution technique to sharpen the 3D photorealistic artificial human-like avatars.

16. The system of claim 11, the processor is further configured to execute the instructions to generate a voice generation network for converting a real voice to that of an avatar.

17. The system of claim 11, wherein the model agnostic meta-learner employs the Generator/Discriminator/Embedder architecture to animate a face.

18. The system of claim 11, wherein the machine learning network used to generate the plurality of 2D photorealistic artificial human-like facial images is a generative Adversarial Network (GAN).

19. The system of claim 11, wherein the machine learning network used to generate the plurality of 2D photorealistic artificial human-like facial images is a Style Transfer Network.

20. A computer program product for automatically generating photorealistic 3D avatars, the computer program product comprising a computer readable storage medium having program instructions embodied therewith, the program instructions executable by a processor of a system to cause the system to:

generate a plurality of 2D photorealistic artificial human-like facial images by a machine learning network;

generate a plurality of 2D photorealistic artificial human-like facial expression images based on the plurality of 2D photorealistic artificial human-like facial images using a model agnostic meta-learner, wherein the model agnostic meta-learner employs a Generator/Discriminator/Embedder architecture to create a comprehensive set of expressions with various mouth and eye positions; and generate a plurality of 3D photorealistic artificial human-like avatars based on the plurality of 2D photorealistic artificial human-like facial expression images.

* * * * *

UNITED STATES PATENT AND TRADEMARK OFFICE
CERTIFICATE OF CORRECTION

PATENT NO. : 11,138,781 B1  
APPLICATION NO. : 16/837573  
DATED : October 5, 2021  
INVENTOR(S) : Jeb R. Linton et al.

Page 1 of 1

It is certified that error appears in the above-identified patent and that said Letters Patent is hereby corrected as shown below:

On the Title Page

Column 1, (72) Inventors: should read as follows:
Jeb R. Linton, Manassas, VA (US);
Satya Sreenivas, Los Alamos, NM (US);
Naeem Altaf, Round Rock, TX (US);
Sanjay Nadhavajhala, Cupertino, CA (US)

Signed and Sealed this
Thirteenth Day of May, 2025

Coke Morgan Stewart
*Acting Director of the United States Patent and Trademark Office*